United States Patent [19]

Hover et al.

[11] Patent Number: 4,923,658

[45] Date of Patent: May 8, 1990

[54] PROCESS FOR THE PRODUCTION OF DYED, FLAT ARTICLES FROM THERMOPLASTIC SYNTHETIC RESINS

[75] Inventors: Alexander Hover, Troisdorf-Spich; Manfred Simon, Neiderkassel; Richard Weiss, Troisdorf, all of Fed. Rep. of Germany

[73] Assignee: Huels Troisdorf AG, Troisdorf, Fed. Rep. of Germany

[21] Appl. No.: 250,151

[22] Filed: Sep. 28, 1988

Related U.S. Application Data

[63] Continuation-in-part of Ser. No. 946,008, Dec. 24, 1986, abandoned, and Ser. No. 946,009, Dec. 24, 1986, abandoned.

[30] Foreign Application Priority Data

Dec. 27, 1985 [DE] Fed. Rep. of Germany ....... 3546151
Dec. 27, 1985 [DE] Fed. Rep. of Germany ....... 3546215

[51] Int. Cl.$^5$ .................... B29C 43/24; B29C 43/30
[52] U.S. Cl. ......................... 264/76; 264/78; 264/115; 264/118; 264/125; 264/132; 264/140; 264/245
[58] Field of Search ............... 264/115, 118, 122, 245, 264/117, 142, 143, 132, 73, 76, 78, 125, 140

[56] References Cited

U.S. PATENT DOCUMENTS

| | | | |
|---|---|---|---|
| 3,192,294 | 6/1965 | Streed | 264/126 |
| 3,265,679 | 8/1966 | Black | 264/117 |
| 3,278,661 | 10/1966 | Beck | 264/117 |
| 3,359,352 | 12/1967 | Powell | 264/126 |
| 3,381,067 | 4/1968 | Kemmler | 156/242 |
| 3,394,210 | 7/1968 | Franze | 264/54 |
| 3,586,654 | 6/1971 | Lerman | 264/117 |
| 3,978,036 | 8/1976 | Pollard | 264/328.18 |
| 4,122,135 | 10/1978 | Valoti | 264/142 |
| 4,309,374 | 1/1982 | Pollard | 264/115 |

FOREIGN PATENT DOCUMENTS

40-1679 1/1940 Japan ....................................... 264/73

Primary Examiner—Jay H. Woo
Assistant Examiner—Jeremiah F. Durkin, II
Attorney, Agent, or Firm—Antonelli, Terry & Wands

[57] ABSTRACT

A process for the production of homogeneous flat articles of thermoplastic synthetic resins wherein a starting mixture based on thermoplastic synthetic resins is processed into agglomerate or granulated material by a thermal pretreatment above the softening temperature and subsequently, optionally after additional intermediate steps, is mechanically comminuted to a mixture of particles having a random grain size distribution. The mixture of particles is piled continuously onto a conveyor belt to form a uniform layer and is sintered, under the action of heat up to the plasticization of the thermoplastic synthetic resin, into a coherent flat articles and is then press-molded under the effect of pressure and heat. The pourable powders or particles are formed from a blend of differently colored agglomerates or granules prepared in a predetermined mixing ratio; the blend being obtained from several colored batches of thermoplastic resin, each batch having a different color from the other and each batch being heat treated above the softening point of the thermoplastic resin. In one variation of the process, at least one liquid or pourable, meltable, colored medium is applied in predetermined patterns and penetrates into the sintered layer up to a desired depth, in particular throughout the entire layer thickness; and thereafter the dyed, sintered layer is compressed under the action of pressure and heat into a compact flat article.

30 Claims, 9 Drawing Sheets

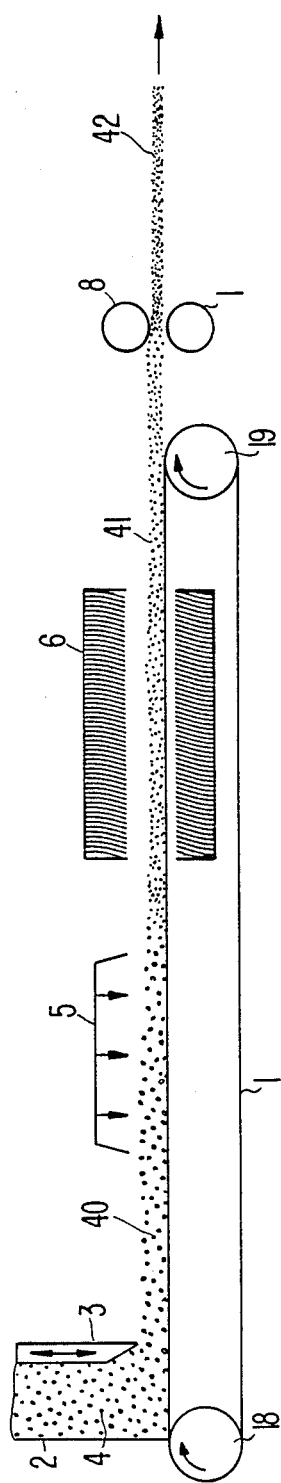
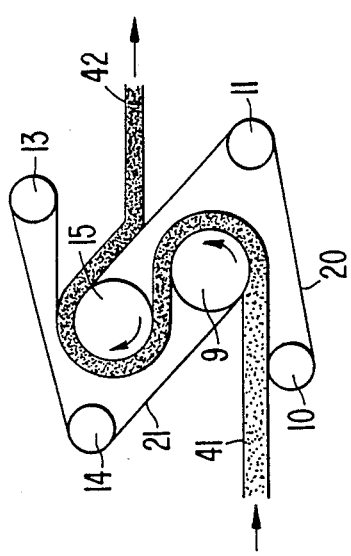
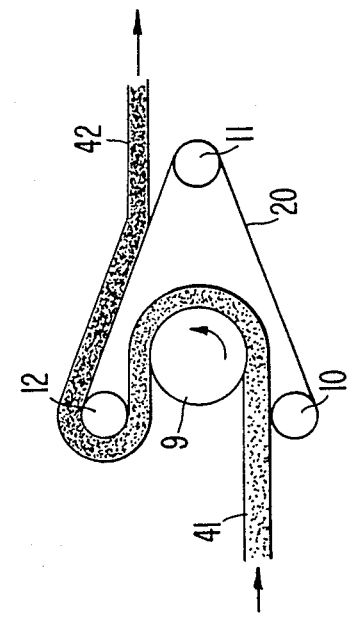
FIG. 1
FIG. 2
FIG. 3

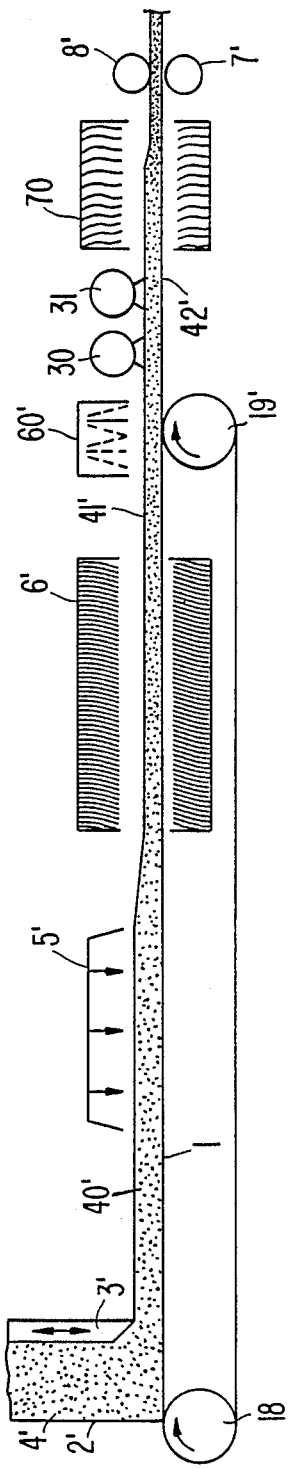
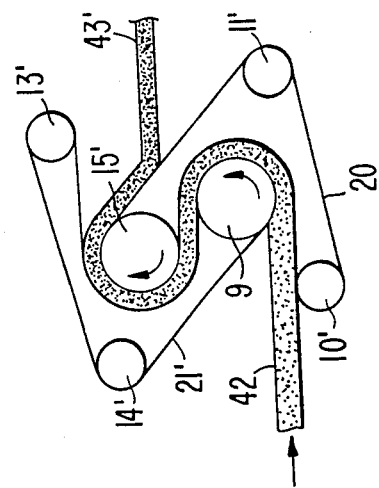
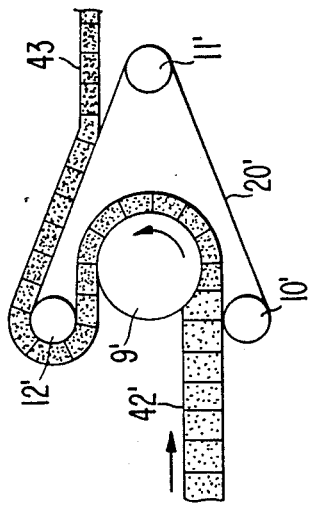
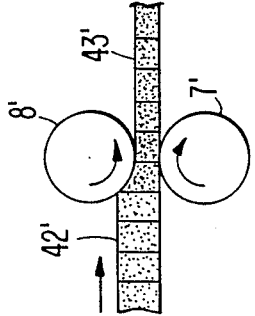

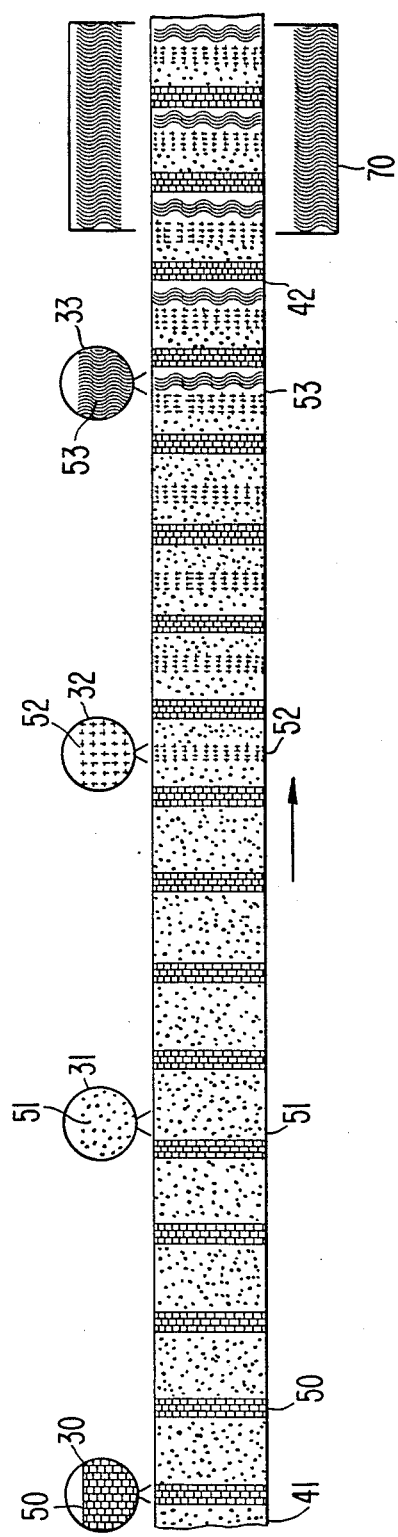

PROCESS FOR THE PRODUCTION OF DYED, FLAT ARTICLES FROM THERMOPLASTIC SYNTHETIC RESINS

CROSS-REFERENCES TO RELATED APPLICATIONS

This is a Continuation-In-Part Application of Ser. No. 946,008, filed Dec. 24, 1986 now abandoned and Ser. No. 946,009, filed Dec. 24, 1986 now abandoned.

BACKGROUND OF THE INVENTION

The invention relates to a process for the production of dyed, homogeneous flat articles based on thermoplastic synthetic resins wherein particles of thermoplastic synthetic resins are sintered into a coherent flat article, such as a sheet and the article is then press-molded under the action heat and pressure and wherein the starting material for forming the particles is obtained from resin preheated above the softness temperature of the resin.

Unicolored, homogeneous flat articles made of a thermoplastic synthetic resin, especially made of polyvinylchloride (PVC), in the form of sheets or panels, with thicknesses of above 1 mm, can be manufactured according to the state of the art by means of extrusion, spread-coating, or rolling methods, resulting in a unicolored, homogeneous molded article conveying, as an inherent design feature, a cold plastic look and a typical plastic image. Even mixtures of various granulated compositions and their processing by means of the extrusion or rolling technique, though providing a color differentiation corresponding to the colors utilized, have not contributed toward lifting the cold feeling inherent in plastic. However, especially when using sheets or panels as floor coverings and wall coverings, special emphasis is placed on esthetic impression. In this connection, it is an object of the invention to create flat articles of thermoplastic synthetic resins conveying an esthetically pleasing optical impression and lending themselves optionally to random patterning.

A process has been known from U.S. Pat. No. 3,381,067 for the manufacture of terrazzo-type floor coverings wherein qranules having a diameter of 6-12 mm and a thickness of 44-800 μm are produced from a plasticized PVC with fillers and colorants and stabilizers, and coated with a -plasticized PVC paste, then piled up into a uniform layer, heated, sintered, and press-molded into a continuous sheet with the use of pressure and heat. By utilizing different compositions for the granules and the coating step, a covering is produced wherein the granules are embedded in a softer shell; i.e. a covering exhibiting differing wear characteristics.

U.S. Pat. No. 3,192,294 discloses a process of the type for the production of floor coverings having a multicolor effect, for example pepper-and-salt patterns, wherein preferably compositions containing PVC, plasticizer and blowing agent in powder form are piled up into a layer and heated to such a degree that the layer is sintered into a coherent sheet which is then expanded by decomposition of the blowing agent, whereafter the sheet, while passing through a roll nip, is embossed on the topside with a relief occupying, e.g., one-half or more of the sheet thickness. The PVC composition is prepared as a dry blend, i.e. mixed in the cold state (also in order to avoid premature decomposition of the blowing agent), and the particles exhibit an average size of 15 μm to about 3 mm, using in each case a uniform particle size, for example, of 15 μm. It is also possible to furthermore add proportions of very small particles of 2 μm made of a copolymer, but this can be very disadvantageous if the fine proportions are separated, i.e. fall through toward the bottom, and the coarse particles form an uneven surface.

The floor coverings produced in accordance with U.S. Pat. No. 3,192,294 with thicknesses of about 2.5 mm are prone to cracking on account of their strong surface embossing, and thus require additional surface protection in the form of an additional film coating. Furthermore, the particle structure is shifted due to the vigorous embossing, so that elongated, nonuniform zones are formed.

U.S. Pat. No. 3,359,352 and German Pat. No. 1,298,023 describe a process for the production of a decorative, multiple-layer covering wherein particles having a grain size of about 2.5 mm to 0.013 mm, produced by mixing PVC powder and plasticizer as well as additives at temperatures of about 93° C., i.e. well below the sintering temperature of the synthetic resin, are piled up on a substrate sheet serving as the support to form a layer and are sintered into a porous sheet. These particles, produced at low temperature far below the plasticizing temperature of the synthetic resin, also called dry blends, are soft and do not show high firmness and dimensional rigidity since they have not been plasticized. During the subsequent press-molding step, the particles thus deliquesce and, when using differently colored particles, result in mixed colors or in deliquescing color contours with an orientation in the rolling direction. It is necessary in this conventional method to utilize a support material as the substrate layer homogeneous flat articles, i.e. layers showing a design throughout without a substrate layer, consequently cannot be manufactured.

SUMMARY

One object of the invention homogeneous flat articles having a fine-textured, random design. This object has been attained according to this invention, in a process wherein a starting material for forming the particles of thermoplastic synthetic resin is processed by a thermal pretreatment above the softening temperature of the resin into an agglomerate or granular mixture and the mixture is mechanically comminuted into a finely particulated mixture having a random grain size distribution.

Even with the use of particles dyed in one color, i.e. unicolored, of a grain mixture of arbitrary or random grain distribution, a polychrome, differentiated coloring is obtained. An infinite variety of color and texture nuances is made possible with the use of only a few different particles of a multicolored design and by means of a differing mixture proportion in the mixture with respect to grain size and grain distribution.

The thermally pretreated particles utilized according to this invention exhibit a firm grainy structure, as contrasted with dry blends, and this grainy structure remains preserved during sintering and does not deliquesce.

According to one embodiment of the invention, particles produced by abrading, forming a mixture of various grain sizes in random distribution, are used for the manufacture of sheets or panels. It is possible, for example, to grind off, with a grinding belt of a specific coarseness, differently colored panels or sheets of a PVC composition containing plasticizer, fillers, stabilizers, pigments, etc. used, for example, as floor coverings, thus obtaining a grinding dust having a granular size of, for example, 0.1–2 mm, initially appearing to be unicolored to the naked eye. By applying this grinding dust, for example by way of a hopper with a doctor blade adjustable at the front side, onto a conveyor belt, e.g. separating paper or a steel band, continuously moving thereunder, and by allowing the piled-up grinding dust then to sinter superficially under an infrared (IR) field or in a heating tunnel, and by thereafter bringing this material to a temperature range required for plasticizing, this superficially sintered rough sheet can then be molded under pressure into a homogeneous, void-free sheet or panel showing a design extending throughout it total thickness. Suitable conveying belt materials are those from which the sheet can be pulled off again without difficulties, such as release paper, "Teflon"-coated fabrics, or also metal belts, such as a steel band, for example. The heat energy required for sintering can be provided by way of IR radiators, hot air, or also in a high-frequency field, and the final compression step can take place continuously via rolling mills, single-belt presses, or preferable twin-belt presses. Depending on the surface structure of the rolls or belts, corresponding surfaces can be embossed. Panels can be punched out from the sheets if desired. It was surprisingly found, in this connection, that there evolves from a originally unicolored grinding dust a polychrome, finely textured, brilliant design no longer exhibiting the plastic look of coldness and uniformity which heretofore had been the rule.

This process of the invention can be varied, by the use of only a few different, multicolor-design rough sheets and by a differing the mixing proportions of the grinding dusts derived therefrom, in such a way that an infinite number of color and texture nuances become possible, Preferably, grains or particles produced by abrading of a preformed resinous article such as a sheet or panel are utilized in a grain mixture wherein the proportion of grain size of 250–800 μm constitutes 60–90% by weight of the mixture comprising the starting material for forming the particles to be compressed into a sheet.

It has furthermore been found, surprisingly, that an analogous polychrome uni-design is obtained by using, in place of grinding dust, agglomerates likewise dyed in different colors, for example having been brought to a specific temperature by friction in a mixer and being applied in varicolored blends. It is furthermore possible to change the character of the agglomerates in regard to structure by means of a grinding step following the mixing step. Moreover, blends of abrasion dust and agglomerate are also possible, along with combinations of filled and unfilled systems, i.e. PVC compositions with and without a filler; by use of transparent synthetic resin particles, a three-dimensional effect is conveyed above and beyond the polychrome character. Such polychrome, homogeneous-panels or also sheets, however, can be produced not only from grinding dust, agglomerate, but also from reclaim material consisting of varicolored edge strips which were chopped and ground. In the same way, a similar effect can be obtained by way of the sinter-pressing method from correspondingly dyed granules which have been ground up. Likewise, mixed PVC powder with additives can be plasticized by way of a plasticizer or extruder and processed into granules or chips or pellets, and these can be ground by means of mills to the desired fine grain, i.e. a fine grain mixture. The PVC compositions can be made to be transparent, unicolored, or also varicolored mixtures of differently colored dusts and grain sizes can be utilized. This results, after press-molding, in a brilliant, finely resolved, multicolored basic tone without directional orientation. Also the grain size and grain distribution of the particles employed cause a muted to distinct appearance of the pattern as a fine or also coarse texture, or create small to large resolution capacity.

Mixtures of the agglomerates are preferably utilized which are produced by mixing a PVC composition at mixing temperatures of up to about 170° C., generated by frictional heat, with subsequent cooling and grinding and optional screening. Such a mixture of agglomerate, leading to a design of an especially pleasing appearance, has, for example, a proportion of about 20 to 75% by weight of the grain size of 500–2,000 μm in the mixture.

According to this invention, the texture of the sheet and thus the pattern, i.e. the polychrome impression, can be varied by changing the shape of the particles, whether produced in grain form, by abrading or by grinding to differing size.

According to another aspect of this invention, the particles are obtained by grinding up agglomerate granules, in this connection, 1, 1.5, or 2 mm screens can be utilized, for example, for the screening step. All of these mixtures produced by grinding contain thermally pretreated particles which had already been plasticized once and thus result in a firm grain structure. Thermal pretreatment took place, for example, during the manufacture of the agglomerate or during extrusion of molded elements subsequently processed into granules, chips, edge strips, waste, and forming the starting material for the grain mixtures to be produced and utilized in accordance with this invention.

A mixture of particles of different origin, for example from grinding processes, preferably contains a proportion of the grain size of 500–2,000 μm of about 30–95% by weight.

It is moreover possible to utilize blends or particles from various origins, colorings, structures, and/or grain distribution.

The polychrome color image is obtained according to this invention especially by using mixtures of particles with a grain distribution wherein each screening fraction is present at least with a minimum proportion of 0.1% by weight, and no screening fraction is present at a proportion larger than 50% by weight.

Sheets or panels having an especially fine and uniformly random design are obtained by using, according to a further suggestion of the invention, qrain mixtures containing 80–98% by weight of grain sizes from 300 to 800 μm.

According to a further embodiment of the invention, flat articles to be utilized especially as floor and wall coverings are obtained with the use of a process wherein a PVC composition containing PVC, plasticizer, an inorganic stabilizer, and a colorant is plasticized above the softening temperature of the resin to form a molded component and the molded component is comminuted into the particle mixture.

In this process, transparent, translucent up to completely colored-through sheets are obtained.

The process for producing the flat articles is preferably performed by piling the mixture of the particles up into a layer having a thickness of preferably about 5–12 mm, and heating to temperatures up to about 210° C.

and sintering, and then press-molding, with a surface pressure in the range from 0.2 to 20 N/mm² or, respectively, a corresponding linear pressure in the roll nip, homogeneously into a sheet or -panel having a final thickness of about 1.5–4 mm.

For the production of filled sheets or panels, the process can be carried out, according to another embodiment of the invention, wherein the polyv-inyl chloride composition is provided with fillers such calcium carbonate and then processed into the particle mixture.

Such homogeneous sheet or panel material of polychrome design can preferably be utilized as floor or wall covering and is predestined for use especially where abrasion or wear represent a dominating problem. Such a covering, homogeneous with respect to its structure, can wear down over the entire thickness without a change in pattern and texture.

The process of this invention -provides a live and also three-dimensional appearance attaining mono- to polychrome effects in dependence on the given coloration. A particular spatial, three-dimensional effect is achieved by a transparent basic material for a portion of the particles in which particles of another color can be embedded.

This process technique according to the invention exhibits the additional advantage, besides a novel design possibility, of not only reprocessing dyed, thermoplastic products obtained as waste in a recycling step by simple means, but also of refining these products into novel, high-quality goods, thus expanding the previous state of the art and enriching the array of homogeneous floor coverings with respect to texture and feel.

The thermoplastic synthetic resin useful for purposes of this invention includes not only PVC but also copolymers of vinyl-chloride with vinyl acetate, ethylenevinyl acetate, and optionally acrylate polymers which can be used individually or in mixtures.

In addition to PVC, other thermoplastic synthetic resins, for example based on ethylene-vinyl acetate, can also be processed into flat articles according to this invention.

According to one embodiment of the invention, particles produced by abrading, constituting a mixture of different grain sizes in random distribution, are used for the manufacture of sheets or panels. It is possible, for example, to abrade panels or sheets dyed in different colors made up of a PVC composition with plasticizer, fillers, stabilizers, pigments, and used, for example, as floor coverings, by means of an abrasive belt of specific coarseness. The result is an abraded dust which initially appears unicolored to the naked eye and has a grain size of, for example, 0.1 to 2 mm. If this abraded dust is applied for example, by way of a hopper with a doctor blade adjustable at the front side, onto a supporting belt, e.g. release paper or a steel band, moving continuously therebeneath, and then the thus-piled up abraded dust is superficially allowed to sinter under an infrared (IR) field or in a heating tunnel, then a porous layer is obtained which can be provided with a design throughout by imprinting or spraying and can subsequently be shaped under pressure into a homogenous, void-free sheet or panel carrying a continuous design over the entire thickness, the structure of the pattern not being blurred or distorted.

This process according to the invention can be varied by using rough sheets with a multicolor design that is only a little different, and by a different mixture proportion and the thus-produced abraded dusts, in such a way that infinitely many color and texture nuances are possible. Preferably, grains or particles produced by abrading are utilized in a grain mixture wherein the proportion of grain sizes of 250 μm–800 μm constitutes 60–90% by weight of the mixture.

For application of coloring media to the superficially sintered, porous layer, liquid, optionally dyed media in the form of pastes, such as PVC pastes, aqueous polymer dispersions, or polymers dissolved in organic solvents or meltable, dyed polymer powders are utilized with preference. The liquid media can be applied in any desired way; preferably, they are imprinted or sprayed on. The printing step takes place in the simplest way by means of a rotational screen printing unit, the number of stations determining the textures and colors to be additionally applied. Of course, patterning can also be provided by way of a spraying procedure, be it by means of reciprocating spray guns or also cyclically operating spray nozzles, as in the chromotronic or millitron method. The sole requirement is that such an amount of colorant be applied in the form of a solution or also a paste that penetration to the desired depth and thus total thickness of the sheet can take place. As for the printing inks, it is possible to utilize dye solutions as well as aqueous dye dispersions, or also coloring pastes, as for example when using grains of plasticized PVC, also dyed PVC pastes.

Preferably, several differently colored liquid media are applied according to the pattern in sequence to various partial areas of the superficially sintered sheet. In this connection, it is not necessary to apply a pattern to the entire sheet surface, since also the sintered basic sheet, after the press-molding step, shows, in turn, unicolored or polychrome color effects, and thus results in the desired design together with the applied colors.

Consequently, for the first time, there are no longer any limits imposed on the type and choice of designs in case of homogeneous coverings with a design extending throughout the entire thickness of the sheet, as created by the process of this invention.

Whereas heretofore it has only been possible to obtain more or less longitudinally oriented or chip-like textures, it is now feasible to realize to a wide extent designs ranging from a geometrical structure of lines and circles to fanciful printed images corresponding to the state of the printing art. Moreover, all homogeneous coverings designed and textured in accordance with the process of this invention convey an entirely different feeling in appearance. This is no longer a cold structure imprinted on a plastic surface but rather a warmth-exuding image as known otherwise only from natural products or textiles.

The process of this invention is quite especially applicable to a development of textile designs and structures in synthetic resins constituting a guideline for this art. By grain size and distribution of the thermoplastics employed, a muted to distinct outward appearance, a fine or also coarse structure, or also a small or even large resolution capacity are attained.

A lively and also spatial appearance is achieved by the process of this invention, in that the imprinted substrate results in a heretofore unknown color and spatial dimension, depending on the color setting, from a mono- to polychromatic effect in combination with an optionally multicolored printing procedure.

The determining factors for the printed image in screen printing are the screen size, the type of printing inks, the dispersion solutions and pastes, as well as the viscosity of the latter.

According to another suggestion of this invention, the superficially sintered layer, prior to application of the liquid media, is cooled to a temperature of below 50° C., preferably below 35° C. This ensures perfect penetration of the dye application and prevents, for example, premature evaporation of solvents or clogging of the pores. In a further development of the process of this invention, it is then suggested to heat the superficially sintered layer provided with the dye application to a temperature of at least 150° C., preferably above 165° C., for compacting purposes.

A preferred mode of operation for the production of flat articles of thermoplastic synthetic resins carrying a design throughout provides, according to this invention, that the particles are piled up into a layer having a thickness of preferably 5–12 mm and are heated to temperatures of up to about 210° C. and thus are superficially sintered; then, the sintered layer is optionally cooled to a temperature of below 50° C., and thereafter the liquid colored media are applied by spraying or printing in a weight per unit area of, for example, 100 to 900 g/m$^2$, preferably about 100 to 500 g/m$^2$, in succession, and optionally the solvent contained therein is evaporated and the superficially sintered layer provided with the dye application is heated to a temperature of at least 150° C., preferably above 165° C. and is press-molded homogeneously into a sheet having a final thickness of about 1.5–4 mm under a surface pressure in the range of about 0.2 to 20 N/mm$^2$ or under a corresponding linear pressure in the roll nip.

The quantity of dye applied depends, in particular, on the type of dye application selected, i.e. whether a dispersion or solution or paste is involved. Furthermore, the amount depends on the thickness of the porous layer and on the pattern.

Suitable conveyor belt materials are those permitting the finished sheet to be pulled off again without any difficulties, such as release paper, "TEFLON" coated fabric, or also metallic belts, such as steel band. The thermal energy required for sintering can be provided by means of IR radiators, hot air, or also in a high-frequency field; the subsequent compressing step can take place continuously by means of rolling mills, single-belt or twin-belt presses. Depending on the surface texture of the rolls or belts, corresponding surfaces can be embossed; the embossing depth can amount preferably up to about 100 μm or also more.

BRIEF DESCRIPTION OF THE DRAWINGS

The invention will be described in greater detail below with reference to the accompanying drawings and examples.

FIG. 1 shows a schematic view of a sintering apparatus with a pair of pressure rollers;

FIG. 2 is a schematic view of a belt press;

FIG. 3 is a schematic view of a twin-belt press;

FIG. 13 is a schematic view of an installation with sintering line, colorant application, and compacting;

FIG. 14 shows a schematic view of the compacting step by means of a pressure rolls;

FIG. 15 is a schematic view of the compacting means of belt presses;

FIG. 16 is a schematic view of the pressing step by means of twin-belt presses;

FIG. 17 shows a dye application station in a crosssectional view;

DESCRIPTION OF THE PREFERRED EMBODIMENTS

Figure 12:
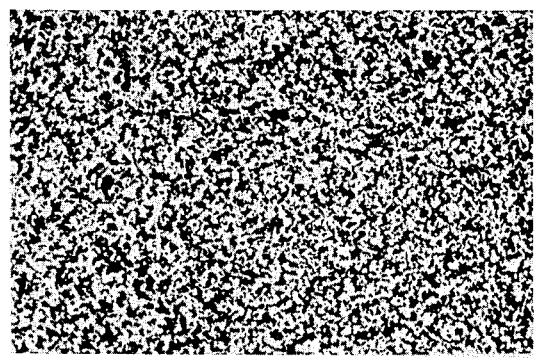
FIGS. 4–12 show various surface designs corresponding to different grain mixtures.

A conveyor belt 1 rotating endlessly over two guide rollers 18, 19, of which at least one is driven, is utilized for the continuous processes according to FIGS. 1, 2, and 3 as the support means. Preferred materials for the conveyor belt 1 are release paper, steel, or also "TEFLON" (polytetrafluoroethylene) belts. By way of the hopper 2 having an adjustable doctor blade 3, the grain mixture 4 to be applied is piled up on the conveyor belt 1 in dependence on the desired final thickness of the flat article, preferably in a thickness of 5–12 mm. Other applicating systems can also be utilized, for example metering chutes. This layer 40 is then continuously heated under, for example, an infrared heater 5 and/or a heating tunnel 6, up to the plasticizing temperature, and sintered to form a continuous flat sheet 41. During this sintering step, the layer 40 loses some volume, and the thickness is reduced correspondingly to about 4–10 mm. Subsequently, the sintered sheet 41 passes through a pressing station, for example an embossing unit, consisting of a metal roll 8 and a rubber roll 7, compressing the sheet 41 and superficially smoothing same, or also providing same with a texture. Thereafter, the final product 42 leaves the installation and is passed on to finishing.

Advantageously, a belt press can be used for compressing the sintered sheet 41, as illustrated in FIG. 2; the belt endlessly rotating over the guide rolls 10, 11, 12 is guided so that it urges the sintered sheet against the roll 9 over a predetermined route. The sheet, after cooling, is removed from belt 20 as the finished sheet 42. Especially advantageously, a twin-belt press is utilized for the compressing step, as schematically illustrated in FIG. 3, this press operating with two belts endlessly rotating over guide rollers 10, 11 and 14, 13, respectively, the sintered sheet 41 being thereby pressed alternatingly against the roll 9 and, respectively, roll 15 and, after cooling and compressing, is taken off the belt 20. The surface of the sheet 42 can be finished either within the belt press or also, for example, by means of an embossing station arranged downstream thereof, or also by means of an abrading and/or polishing step.

The examples set forth below represent embodiments of the process of this invention as illustrated in FIG. 1, and of the production and use of the grain mixtures.

EXAMPLE 1

A basic batch is first of all mixed from filled plasticized PVC, with the following proportions:
 31 parts by weight of PVC "Vinnol Y 68 M" (company: Wacker-Chemie)
 13 of dioctyl phthalate
 25 of chalk
 0.15 of stabilizer based on Sn,
and respectively 70 parts by weight of this batch is combined separately with the coloring pigments set forth below and is granulated after mixing by means of an extruder:

| Color Number | Color: | Parts by Weight: |
|---|---|---|
| 1 | medium-brown | 0.7 |
| 2 | light brown | 0.987 |
| 3 | beige-greenish | 1.337 |
| 4 | dark brown | 0.252 |

Extrusion temperature 170° C., granule diameter 4–5 mm.

The granules are then once again mixed in the following weight rations: color number 1:2:3:4=1:1:1:0.76, and processed by means of extruder and rolling mill into a marbled sheet material. During calibrating by abrading with belts of number 50 and number 100 abrasive grain, an abrasion dust is obtained having the following grain distribution (wet screening):

| mm | % |
|---|---|
| 0.04 | 0.7 |
| 0.004–0.063 | 0.4 |
| 0.063–0.1 | 0.2 |
| 0.1–0.125 | 0.9 |
| 0.125–0.2 | 2.0 |
| 0.2–0.25 | 7.8 |
| 0.2–0.315 | 16.4 |
| 0.315–0.5 | 35.5 |
| 0.5–0.8 | 32.5 |
| 0.8–1.0 | 3.1 |
| 1.0–1.6 | 0.4 |
| 1.6–2.0 | 0.1 |

The thus-obtained grinding dust is applied via a hopper with level-adjustable doctor blade with a gap setting of 5 mm onto a release paper sheet, see FIG. 1, and superficially sintered under an infrared radiator having a length of 0.6 (7.5 kW) and through a hot-air tunnel having a length of 6 m, at temperatures of 160°–205° C. and at a rate of 1m/min.

The sintered sheet can thereafter be continuously compacted and embossed in one operating step by way of infrared radiators and an embossing roll unit to form polychrome, compact uniform covering having a thickness of 2 mm.

EXAMPLE 2

The grinding dust obtained according to Example 1 is mixed in a proportion of 1:1 with a grinding dust B obtained from a different color combination and produced in the following composition:

| Color Number | Color: | Parts by Weight (per 70 parts of basic batch according to Example 1): |
|---|---|---|
| 5 | dark greyish brown | 0.24 |
| 6 | dark reddish brown | 0.45 |
| 7 | medium brown | 0.4 |
| 8 | beige-reddish | 1.0 |

The mixture had the granule ratio of: color number 5:6:7:8=1:1:1:0.76.

The grinding dust had the following grain structure:

| mm | % |
|---|---|
| 0.04 | 0.9 |
| 0.04–0.063 | 0.2 |
| 0.063–0.1 | 0.2 |
| 0.1–0.125 | 1.0 |
| 0.125–0.2 | 3.9 |
| 0.2–0.25 | 10.3 |
| 0.25–0.315 | 16.3 |
| 0.315–0.5 | 42.7 |
| 0.5–0.8 | 23.5 |
| 0.8–0.1 | 0.8 |
| 1.0–1.6 | 0.1 |
| 1.6–2.0 | 0.1 |

The grinding dust mixture A+B from two sheets dyed with different marbling, with a total of 8 basic colors, is sintered analogously to Example 1 and, after cooling, is punch out and press-molded under the action of a press at a temperature of 150° C. to a homogeneous sheet having a thickness of 2 mm and exhibiting a brilliant polychrome mixture.

EXAMPLE 3

From the sheets produced according to Example 1, edge strips can be cut off, comminuted into chips having a size of 5–10 mm, and ground in an "Alpine" mill with a 2 mm size screen. The sheets and panels sintered and compressed from the ground reclaim analogously to Example 1 likewise yield, in dependence on the grain size and grain distribution, a polychrome texture, the appearance of which, when viewed close-up, as also in case of Examples 1 and 2, is not oriented nor strictly bounded and, from afar, have the effect of live unitary structures with respect to their character.

The grain structure was:

| mm | % |
|---|---|
| 0.04 | 0.9 |
| 0.04–0.063 | 1.0 |
| 0.063–0.1 | 1.2 |
| 0.1–0.125 | 1.4 |
| 0.125–0.2 | 1.6 |
| 0.2–0.25 | 1.2 |
| 0.25–0.315 | 1.4 |
| 0.315–0.5 | 4.8 |
| 0.5–0.8 | 10.7 |
| 0.8–1.0 | 11.8 |
| 1.0–1.6 | 22.4 |
| 1.6–2.0 | 41.6 |

EXAMPLE 4

A polychrome uniform covering can also be produced, just as of grinding dust and ground reclaim, from the primarily produced granulated composition. The mixture, prepared in correspondence with Example 1 in 4 colors, was separately plasticized in an extruder, and granules having a size of 4–5 were produced therefrom, and likewise the mixtures prepared according to Example 1 in 4 colors. Both granulated materials are mixed 1:1, comminuted in an "Alpine" mill with a 2 mm screen, and applied to a metal belt in a thickness of about 5 mm, sintered, and subsequently press-molded in a press into a sheet at a temperature of 150° C. Here, too, with only two basic colors, a polychrome color differentiation is attained.

The grain distribution was:

| mm | % |
| --- | --- |
| 0.04 | 1.0 |
| 0.04–0.063 | 0.5 |
| 0.063–0.1 | 0.8 |
| 0.1–0.125 | 1.3 |
| 0.125–0.2 | 1.6 |
| 0.2–0.25 | 1.2 |
| 0.25–0.315 | 1.3 |
| 0.315–0.5 | 3.8 |
| 0.5–0.8 | 8.8 |
| 0.8–1.0 | 11.5 |
| 1.0–1.6 | 24.6 |
| 1.6–2.0 | 43.6 |

EXAMPLE 5

The processing of this invention can be performed not only with plasticized material, such as granules, reclaims or abraded dust, but also with agglomerate that can be manufactured during the mixing process in a controlled fashion.

PVC "Vinnol P 70", plasticizer, chalk, stabilizer are mixed in accordance with Example 1 with separate addition of the coloring pigments in a powder mixer with rotor, and heated by frictional heat to 140° C., and cooled under agitation in a separate vessel and thereafter passed through an "Alpine" mill with a 2 mm screen.

The four differently dyed agglomerate batches are mixed in the following proportion:
  color number 1:2:3:4 = 1:1:1:0.76, and processed on a continuous conveyor as shown in FIG. 1 in correspondence with Examples 1–4 into polychrome uniform sheets.

The grain distribution was:

| mm | % |
| --- | --- |
| 0.04 | 3.1 |
| 0.04–0.063 | 10.1 |
| 0.063–0.1 | 16.4 |
| 0.2–0.125 | 6.2 |
| 0.125–0.2 | 8.6 |
| 0.2–0.25 | 4.1 |
| 0.25–0.315 | 3.5 |
| 0.315–0.5 | 7.3 |
| 0.5–0.8 | 9.6 |
| 0.8–1.0 | 7.3 |
| 1.0–1.6 | 13.4 |
| 1.6–2.0 | 10.4 |

EXAMPLE 6

In correspondence with Example 5, an agglomerate is produced without adding filler and dye, in a transparent grade. The 4-color agglomerate mixture produced according to Example 5 is mixed with the filler-free agglomerate in a ratio 1:1, applied to a "Teflon" belt in a thickness of 6 mm, superficially sintered, and continuously compacted in a belt press, thus obtaining a polychrome covering with depth effect.

The grain structure was:

| mm | % |
| --- | --- |
| 0.04 | 0.2 |
| 0.04–0.063 | 1.2 |
| 0.063–0.1 | 3.2 |
| 0.1–0.125 | 3.2 |
| 0.125–0.2 | 6.9 |
| 0.2–0.25 | 5.4 |
| 0.25–0.315 | 5.7 |
| 0.315–0.5 | 14.4 |
| 0.5–0.8 | 17.2 |
| 0.8–1.0 | 10.8 |
| 1.0–1.6 | 15.7 |
| 1.6–2.0 | 16.1 |

EXAMPLE 7

The abraded dust described in Example 1 is mixed with the reclaim ground in Example 3 and the grain mixture ground from granules in Example 4, in a ratio of 2:4:4, and processed analogously to Example 6, thus obtaining, in spite of the differing grain structures and platicizing stages within the blend, a brilliant and clear polychrome appearance.

The grain structure was:

| mm | % |
| --- | --- |
| 0.04 | 0.6 |
| 0.04–0.063 | 0.5 |
| 0.063–0.1 | 0.6 |
| 0.1–0.125 | 1.2 |
| 0.125–0.2 | 2.0 |
| 0.2–0.25 | 3.3 |
| 0.25–0.315 | 5.3 |
| 0.315–0.5 | 13.0 |
| 0.5–0.8 | 24.6 |
| 0.8–1.0 | 18.2 |
| 1.0–1.6 | 14.6 |
| 1.6–2.0 | 16.1 |

EXAMPLE 8

69 parts by weight of "Escorene UL 00728" (company: Esso)[1]
30 parts by weight of "Juraperle MHM" (company: Ulmer Fuellstoffe)[2]
1 part by weight of color pigment-dye mixture

[1] Ethylene-vinyl acetate copolymer with about 28% vinyl acetate
[2] Chalk

"Escorene UL 00728" was preplasticized at 120° C. in a rolling mill, then filler and color mixture were added in portions within 5 minutes, and rolling was continued for 10 minutes. Then the rolled sheet was taken off and preliminarily comminuted in the warm condition into sections of about 6×6 cm. The cooled-off sections were ground on a cutting mill with a 1.2 mm screen.

The grain distribution was:

| mm | % |
| --- | --- |
| 0.25 | 5.5 |
| 0.25–0.315 | 1.0 |
| 0.315–0.5 | 5.5 |
| 0.5–0.8 | 16.7 |
| 0.8–1.0 | 25.1 |
| 1.0–1.25 | 34.2 |
| 1.25–1.6 | 11.7 |
| 1.6–2.0 | 0.3 |

The resultant grain was mixed with a differently pigmented material, produced in the same way, in a ratio of 1:1:1:1. Thereafter, the premix is applied with a doctor blade onto a steel belt with a thickness of 6 mm and sintered. The sintered sheet, reduced in thickness to about 4 mm thereby, olded in a twin-belt press at a temperature of 110° C. into a polychrome sheet having a thickness of 2 mm.

EXAMPLE 9

The sintered sheet produced according to Example 1 can likewise be produced in one working step by way of infrared radiators and a smoothing roll unit continuously into a polychrome, rough, nonslip covering having a thickness of 3 mm, with a lessor amount of compacting by a corresponding calibration in the roll nip. A covering is thus obtained showing a depth effect and having a special textile appearance.

Analogously, the sintered sheet produced in accordance with Example 8 can be calibrated by way of a roll nip, thus producing a nonslip, polychrome covering.

FIGS. 4 through 12 show designs of floor coverings that can be obtained in accordance with the examples. The black-white reproduction fails, of course, to convey the colored impression, but the fine texturing can be recognized at least in its basic traits, even though the color nuances are lost.

The thus-produced sheets or panels exhibit a design not only on the surface but have such design throughout the entire thickness of the sheet, so that with wear and abrasion during use the surface design is not lost.

Figure 4:
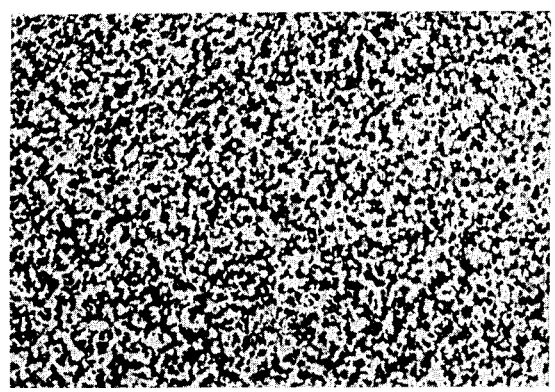

FIG. 4 shows a top view of a finished product made up of four different agglomerates according to Example 4, but with different grain distribution.

Figure 5:
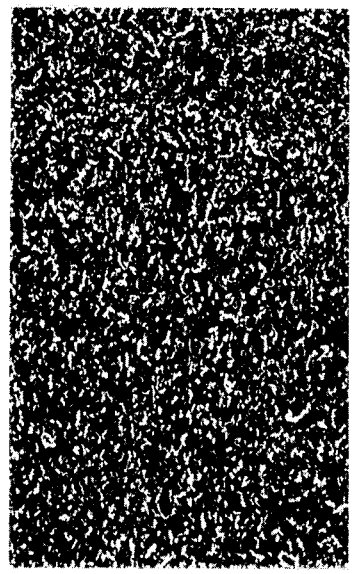
Figure 6:
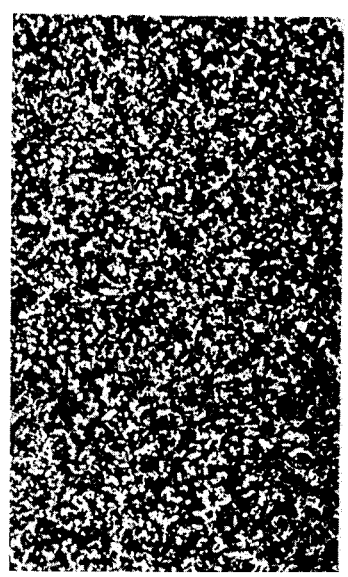
Figure 7:
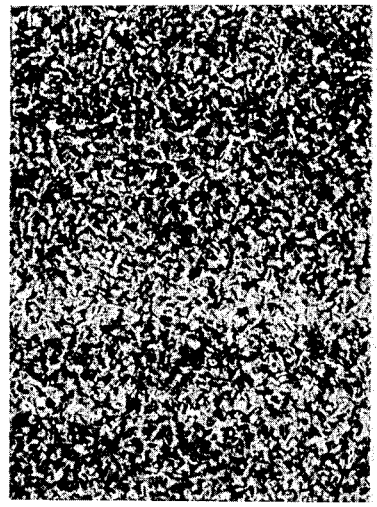
Figure 8:
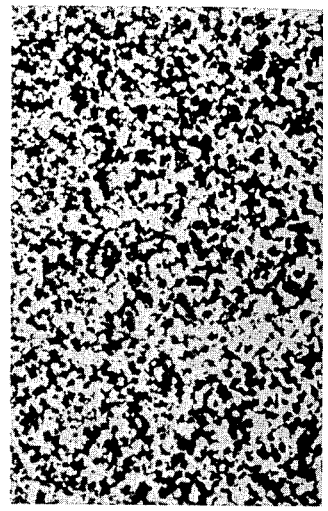
Figure 9:
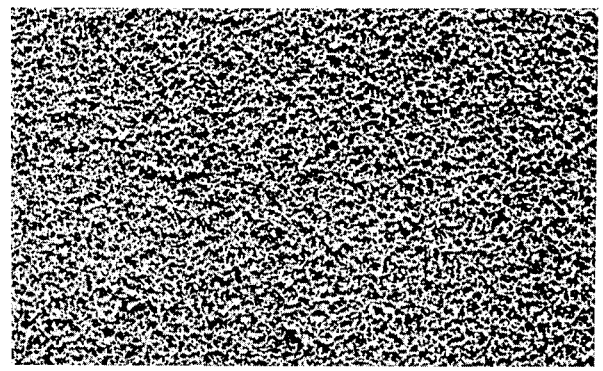
Figure 10:
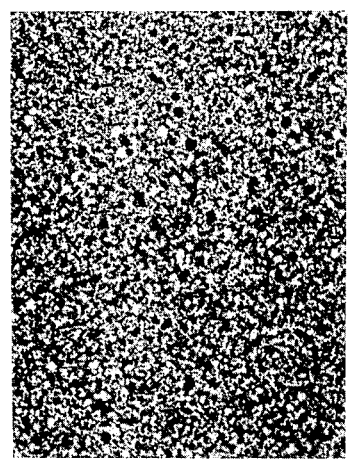
Figure 11:
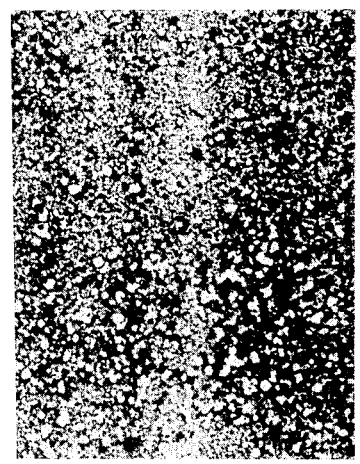

FIG. 5 shows a top view of the sintered sheet according to Example 1 in a 1.3-fold magnification, and FIG. 6 shows a top view of the finished product according to Example 1, i.e. the compacted sheet.

Another process of this invention will be described in detail with reference to the schematic view in FIG. 13. The support utilized is preferably a conveyor belt 1' rotating endlessly over two guide rollers 18', 19', of which at least one is driven. Preferred supports are release paper, steel, or also "TEFLON" (polytetrafluoroethylene) belts. By way of the hopper 2 with an adjustable doctor blade 3', the grain mixture 4 to be applied is piled up on conveyor belt 1' depending on the final thickness desired for the flat article, preferably in a thickness of 5–12 mm (for floor coverings) Other applicating systems can likewise be employed, such as, for example, metering chutes or blade roll coaters. This layer 40' is then heated to the plasticizing temperature continuously under, for example, an infrared field 5' and/or a heating tunnel 6', in the tunnel from the top and from the bottom, and sintered into a homogeneous flat article 41'. During this sintering step, the layer 40' loses some volume, and the thickness is correspondingly reduced to about 4–10 mm.

During the continuous manufacturing process, the sintered sheet 41' is allowed to cool off after sintering, for example while passing through the cooling station 60, utilizing air nozzles, for instance, before the sheet is provided with a design in the dye application stations 30, 31. The number of application stations 30, 31 depends on the pattern desired, and this holds true as well for the type of application station; type and number of application stations determine the textures and multicolored feature of the designs, and the respective screen size of the rotational templates determines the volume of coloring media to be applied.

Suitable coloring media are solvent-free systems, such as, for example, PVC pastes, or also aqueous polymer dispersions or furthermore polymers dissolved in organic solvents. However, it is also possible to work with a heated polymer melt, as well as with dyed polymer powders. The melt necessitates an intermediate cooling line, and the powder application requires a heating as well as cooling zone between the individual stations. In contrast thereto, when using systems liquid in normal temperatures, the process can be carried out wet in wet. Subsequently, the dyed sintered sheet 42' is conducted through a heating zone 70 for the optional drying of the color application and for heating in order to carry out compacting.

After the dye application stations, the sheet 42', penetrated by coloring medium, passes through a pressing station, for example a pair of embossing rolls 7', 8', the sheet 42' being compressed and smoothed on the surface, or also being provided with a very fine embossing. Then, the final product 43 leaves the installation and is passed on to finishing.

FIG. 14 shows schematically a pressing and embossing unit with a rubber roll 7' and a metal roll 8'. For compressing the sintered sheet with applied dye, 42', it is also possible, as illustrated in FIG. 15, to use a belt press, wherein the belt, endlessly rotating over the guide rolls 10', 11', 12', is guided so that it urges the sintered sheet 42' against the belt roll 9' over a predetermined route; and, after cooling, the sheet is taken off from the belt 20' as the finished sheet 43. Preferably, as illustrated schematically in FIG. 16, a twin-belt press is used for the compression step, operating with two belts endlessly rotating over guide rollers 10', 11' and 14', 13', respectively, which belts press the sintered sheet 42' alternatingly against the roll 9' and, respectively, roll 15'; and the sheet is taken off, after cooling and compression, from the belt 20'. The surface of the sheet 43 can be refined either in the belt press or also, for example, by means of an embossing station arranged downstream thereof or also by means of an abrasion and/or polishing procedure.

FIG. 17 shows in an enlarged view the dye application station. In the embodiment, four dye application stations 30–33 are provided, filled with various-color, dyes 50–53 The inks or coloring media 50–53 can penetrate into the porous, open-pore sintered sheet 41' and pass through to the opposite side so that the printed image is represented throughout the entire thickness. After application of the coloring media and penetration thereof, a drying step is first performed in the heating tunnel 70 in case of the use of aqueous or solvent-containing coloring media, and then, with higher temperatures being made effective on the sintered sheet 42, provided with the dye application, at the end of the heating tunnel, the temperatures are reached which are required for the embossing step. The embossing station follows, as indicated in FIGS. 14, 15 and 16. In the embossing station, the sheet 42 is compacted and the surface embossed.

Figure 18:
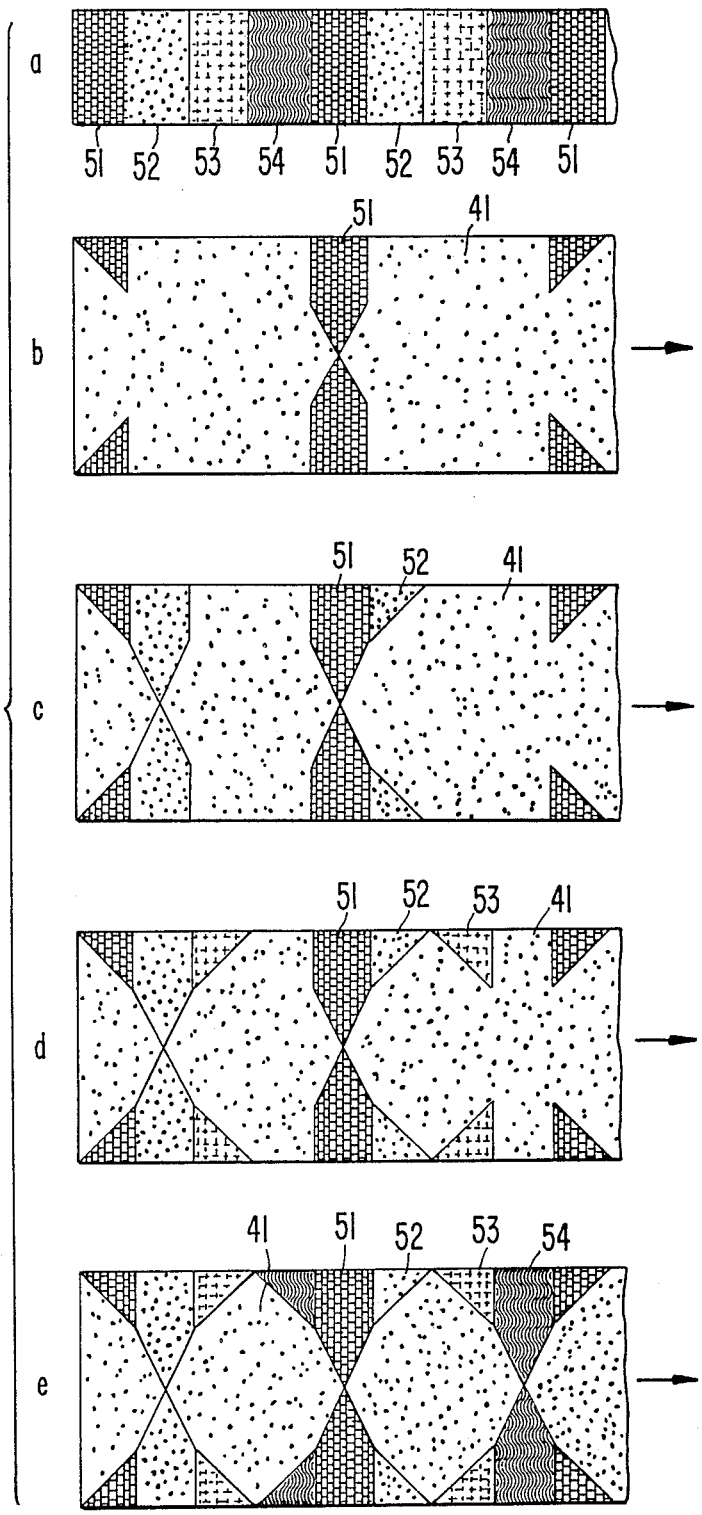
FIGS. 18a to 18e show phases of multiple imprinting by means of flat screen printing templates according to FIG. 5.

FIGS. 18a-18e show a top view of the coloring medium application stations according to FIG. 17 and illustrates the individual patterning steps by way of example in the individual phases. In this connection, FIG. 18a shows the patterned sheet in a cross section with the various colors 51 through 54 that have penetrated through the sheet. The number of printing steps performed is arbitrary; it is possible, for example, to print also in six colors and designs. There is free choice with respect to the possibilities of the individual printed images. FIG. 18b shows the printing of the first colored ink 51 onto the porous sintered sheet 41; FIG. 18c shows the printing of the second color 52; FIG. 18d shows the printing of the third color 53; and FIG. 18e shows the imprinting of the fourth color 54. It is also possible to leave areas devoid of dye application, since with a dyed or transparent or translucent basic material for the sintered sheet 41, here, too, an additional patterning effect occurs. In any event, the applied pattern is in existence over the entire thickness of the sheet so that the surface design is not lost during usage with wear and abrasion, for example as floor covering. Consequently, such a sheet can be worn down practically to an extent of 100% without loss of design.

The examples set forth below represent possible embodiments of this process of this invention and of the production and use of the grain mixtures and coloring media.

EXAMPLE 10

A basic batch which was prepared similarly to Example 1, is first of all mixed from filled plasticized PVC, with the following proportions:

31 parts by weight of PVC "Vinnol Y 68 M" (company: Wacker-Chemie)
13 of dioctyl phthalate
25 of chalk
0.15 of stabilizer based on Sn, and respectively 70 parts by weight of this batch is combined separately with the coloring pigments set forth below and is granulated after mixing by means of an extruder:

| Color Number | Color: | Parts by Weight: |
|---|---|---|
| 1 | medium brown | 0.7 |
| 2 | light brown | 0.987 |
| 3 | beige-greenish | 1.337 |
| 4 | dark brown | 0.252 |

Extrusion temperature 170° C., granule diameter 4–5 mm.

The granules are then once again mixed in the following weight ratios: color number 1:2:3:4=1:1:1:0.76, and processed by means of extruder and rolling mill into a marbled sheet material. During calibrating by abrading with belts of number 50 and number 100 abrasive grain, an abrasion dust is obtained having the following grain distribution (wet screening):

| mm | % |
|---|---|
| 0.04 | 0.7 |
| 0.04–0.063 | 0.4 |
| 0.063–0.1 | 0.2 |
| 0.1–0.125 | 0.9 |
| 0.125–0.2 | 2.0 |
| 0.2–0.25 | 7.8 |
| 0.25–0.315 | 16.4 |
| 0.315–0.5 | 35.5 |
| 0.5–0.8 | 32.5 |
| 0.8–1.0 | 3.1 |
| 1.0–1.6 | 0.4 |
| 1.6–2.0 | 0.1 |

The thus-obtained grinding dust is applied via a hopper with level-adjustable doctor blade with a gap setting of 5 mm onto a release paper sheet, and superficially sintered under an infrared radiator having a length of 0.6 m (7.5 kW) and through a hot-air tunnel having a length of 6 m, at temperatures of 160°–205° C. and at a rate of 1m/min.

The superficially sintered, cooled material is subsequently imprinted with dyed PVC pastes with a four-color rotational screen printing unit.

The pastes had the following composition:
270 parts by weight of PVC "Vinnol P 70 E"
135 parts by weight of PVC "Vinnol C 65 V"
164 parts by weight of "Linplast 68 P"
9 parts by weight of "Irgastab T 150"
9 parts by weight of "Reoplast 39"
56 parts by weight of "Calcicoll SW 35"
4 parts by weight of "Minex 7"
48 parts by weight of "Edenol 190"
1 part by weight of dye In correspondence with the four-color printing design, and in adaptation to the abrasion dust utilized, the 4 required pastes were respectively dyed in medium brown, light brown, beige-greenish, and dark brown. The imprinted design was textile structures having a screen size of 40 mesh. The imprinted PVC paste then penetrates in correspondence with the predetermined pattern through the entire thickness of the superficially sintered layer. This process can be carried out wet in wet without blurring of the individual colors. The amount of paste applied was 580 g/m$^2$. After printing of the pattern and subsequent penetration of the paste to the rear side of the sintered layer, the material was conducted through a heating tunnel at a temperature of 180°–200° C. and with a rate of 2 m/min. The surface was additionally heated by means of a subsequent IR field of 7.5 kW. Then, in an embossing station, the superficially sintered sheet is compacted with simultaneous surface embossing. The product was a textile printed design extending throughout the entire sheet thickness of 2 mm, wherein additionally the polychrome basic structure of the sintered material further enhanced the effect.

The superficially sintered and patterned sheet material produced in accordance with this example could likewise be compacted and smoothed by way of a belt press at about 170° C.

EXAMPLE 11

The grinding dust obtained according to Example 10 is mixed in a proportion of 1:1 with a grinding dust B obtained from a different color combination and produced in the following composition:

| Color Number | Color: | Parts by Weight (per 70 parts of basic batch): |
|---|---|---|
| 5 | dark greyish brown | 0.24 |
| 6 | dark reddish brown | 0.45 |
| 7 | medium brown | 0.4 |
| 8 | beige-reddish | 1.0 |

The mixture had the granule ratio of: color number 5:6:7:8=1:1:1:0.76.

The grinding dust had the following grain structure:

| mm | % |
|---|---|
| 0.04 | 0.9 |
| 0.04–0.063 | 0.2 |
| 0.063–0.1 | 0.2 |
| 0.1–0.125 | 1.0 |
| 0.125–0.2 | 3.9 |
| 0.2–0.25 | 10.3 |
| 0.25–0.315 | 16.3 |

-continued

| mm | % |
| --- | --- |
| 0.315–0.5 | 42.7 |
| 0.5–0.8 | 23.5 |
| 0.8–1.0 | 0.8 |
| 1.0–1.6 | 0.1 |
| 1.6–2.0 | 0.1 |

The abraded dust mixture A and B from two differently dyed sheets with a total of 8 basic colors is introduced into a frame mold having an edge thickness of 7 mm, then placed in a heating cabinet, and superficially sintered for 9 minutes at 250° C. The material, which is thereafter cooled and has a reduced thickness of 5 mm, is provided with a design by means of a flat screen printing step and with the use of a dyed PVC dispersion. The screen size was 0.42 in diameter. The PVC dispersion employed had the following composition:

250 parts by weight of water
5 parts by weight of ammonium hydroxide
250 parts by weight of "Vestolit Dispersion M"
15 parts by weight of "Byk NP 1300"
15 parts by weight of "Etingal TP"
30 parts by weight of "Unimoll BB"
200 parts by weight of "Latecoll W 55"
6 parts by weight of "Disperbyk"
170 parts by weight of "Colanyl" oxide yellow G
130 parts by weight of "Colanyl" oxide black G The amount applied was 176 g/m² in the wet state. The dye dispersion had penetrated, in correspondence with the printed image, through the entire layer thickness. Further processing took place as in Example 1.

A molded component is obtained exhibiting a polychrome basic structure and provided with a design produced by the printed pattern and homogeneous throughout.

EXAMPLE 12

From the sheets produced according to Example 1, edge strips can be cut off, comminuted into chips having a size of 5–10 mm, and ground up in an "Alpine" mill having a 2 mm screen.

The grain structure was:

| mm | % |
| --- | --- |
| 0.04 | 0.9 |
| 0.04–0.063 | 1.0 |
| 0.063–0.1 | 1.2 |
| 0.1–0.125 | 1.4 |
| 0.125–0.2 | 1.6 |
| 0.2–0.25 | 1.2 |
| 0.25–0.315 | 1.4 |
| 0.315–0.5 | 4.8 |
| 0.5–0.8 | 10.7 |
| 0.8–1.0 | 11.8 |
| 1.0–1.6 | 22.4 |
| 1.6–2.0 | 41.6 |

The ground reclaim was superficially sintered and, after cooling, provided with a design by means of a flat screen printing unit and a dyed PVC dispersion analogously to Example 2, dried, and compressed. The dye application was 480 g/m².

The panel, having a thickness of 2 mm, was provided with the design throughout and also exhibited a polychrome basic structure.

EXAMPLE 13

The basic batch, provided according to Example 10 with 1.5% light-green color pigment was mixed and granulated by way of an extruder, temperature 170° C., granule diameter 4–5 mm. The granulated material was ground up by means of a Pallmann mill, type PP6, gap 0.5 mm.

The grain distribution was:

| mm | % |
| --- | --- |
| 0.04 | 0.6 |
| 0.04–0.063 | 0.3 |
| 0.063–0.1 | 0.3 |
| 0.1–0.125 | 1.3 |
| 0.125–0.2 | 3.3 |
| 0.2–0.25 | 5.5 |
| 0.25–0.315 | 9.2 |
| 0.315–0.5 | 29.8 |
| 0.5–0.8 | 29.5 |
| 0.8–1.0 | 12.3 |
| 1.0–1.6 | 5.7 |
| 1.6–2.0 | 2.2 |

The ground material was piled up in correspondence with Example 12 to a height of 10 mm, processed by flat screen printing with a dyed PVC paste according to Example 1, and compacted according to Example 10.

Paste application was 700 g/m², and final panel thickness was 2.3 mm. A panel was obtained exhibiting a unitary basic tone over the total thickness of 2.3 and a design throughout that was of a darker tint.

EXAMPLE 14

The process of this invention can be performed not only with plasticized material, such as granules, reclaims or abrasion dust, but also with agglomerate that can be manufactured in a controlled fashion during the mixing process.

In accordance with Example 1, PVC "Vinnol P 70", plasticizer, chalk, stabilizer are mixed, adding the dye pigments separately, in a rotor powder mixer and frictionally heated to 140° C. and cooled under agitation in a separate vessel and thereafter passed through a Pallmann mill having a 2 mm screen.

The grain structure was:

| mm | % |
| --- | --- |
| 0.04 | 0.6 |
| 0.04–0.063 | 0.4 |
| 0.063–0.1 | 0.9 |
| 0.1–0.125 | 2.9 |
| 0.125–0.2 | 11.3 |
| 0.2–0.25 | 9.5 |
| 0.25–0.315 | 10.0 |
| 0.315–0.5 | 27.1 |
| 0.5–0.8 | 27.9 |
| 0.8–1.0 | 7.3 |
| 1.0–1.6 | 1.8 |
| 1.6–2.0 | 0.3 |

The ground-up product was introduced according to Example 11 into a frame mold having a filling level of 5.5 mm and further processed. The design was produced with a color dispersion wherein the application was 524 g/m² and the flat screen printing unit permitted flat screen print.

The sheet, having a thickness of 2.25 mm, showed, with a basic unicolor, a design throughout which was also of one tone.

EXAMPLE 15

Two agglomerate batches in the colors light brown and dark brown were produced in accordance with Example 5 and ground up in a Pallmann mill PP6 and mixed in a ratio of 1:1.
The grain distribution was:

| mm | % |
| --- | --- |
| 0.04 | 1.1 |
| 0.04–0.063 | 3.4 |
| 0.063–0.1 | 5.7 |
| 0.1–0.125 | 6.9 |
| 0.125–0.2 | 17.2 |
| 0.2–0.25 | 11.7 |
| 0.25–0.315 | 11.2 |
| 0.315–0.5 | 22.8 |
| 0.5–0.8 | 16.2 |
| 0.8–1.0 | 2.6 |
| 1.0–1.6 | 0.8 |
| 1.6–2.0 | 0.4 |

The mixture was filled into a frame mold with a filling level of 5.5 mm. Then heating took place in a heating cabinet at 250° C. with a residence time of 9 minutes. The cooled, sintered material was provided with a design by the flat screen printing process with the use of a dye solution. The formulation of the dye solution was:
49.5 parts by weight of "Maragloss GOL"
24.4 parts by weight of "Maragloss GO 045" brown
13.0 parts by weight of "Maragloss GO 021" yellow
9.5 parts by weight of "Maragloss GO 070" white
1.6 parts by weight of "Maragloss GO 036" red
The quantity applied was 214 g/m² in the wet state.
The dried material was pressed under pressure at 150° C., thus obtaining a homogeneous panel of polychrome structure in the basic tone and carrying a brown-colored design throughout.

EXAMPLE 16

An agglomerate was produced analogously to Example 5 without chalk and colorant. The agglomerate was ground on an "Alpine" mill with a 1.5 mm screen.
The grain structure was:

| mm | % |
| --- | --- |
| 0.04 | 0.2 |
| 0.04–0.063 | 0.9 |
| 0.063–0.1 | 1.9 |
| 0.1–0.125 | 2.6 |
| 0.125–0.2 | 5.0 |
| 0.2–0.25 | 4.2 |
| 0.25–0.315 | 4.8 |
| 0.315–0.5 | 15.3 |
| 0.5–0.8 | 33.1 |
| 0.8–1.0 | 23.4 |
| 1.0–1.6 | 8.3 |
| 1.6–2.0 | 0.3 |

The ground grain mixture was piled up to a height of 6 mm and sintered. After cooling, the sheet was provided by flat screen printing with a design using several dye solutions of a yellow-reddish tone.
The wet application was 185 g/m².
The formulation was:
100 parts by weight of "Maragloss GOL"
20 parts by weight of "Maragloss QNV"
5 parts by weight of "Ceres" yellow 3 G
The patterned material was dried and then compressed into a sheet having a thickness of 2 mm at 150° C. A transparent, homogeneous panel was obtained conveying a three-dimensional effect on account of the design extending throughout.

EXAMPLE 17

69 parts by weight of "Escorene UL 00728" (company: Esso)[1]
30 parts by weight of "Juraperle MHM" (company: Ulmer Fuellstoffe)[2]
1 part by weight of color pigment-dye mixture

[1] Ethylene-vinyl acetate copolymer with about 28% vinyl acetate
[2] Chalk

"Escorene UL 00728" was preplasticized at 120° C. in a rolling mill, then filler and color mixture were added in a portions within 5 minutes, and rolling was continued for 10 minutes. Then the rolled sheet was taken off and preliminarily comminuted in the warm condition into sections of about 6×6 cm. The cooled-off sections were ground on a cutting mill with a 1.2 mm screen.
The grain distribution was:

| mm | % |
| --- | --- |
| 0.25 | 5.5 |
| 0.25–0.315 | 1.0 |
| 0.315–0.5 | 5.5 |
| 0.5–0.8 | 16.7 |
| 0.8–1.0 | 25.1 |
| 1.0–1.25 | 34.2 |
| 1.25–1.6 | 11.7 |
| 1.6–2.0 | 0.3 |

The resultant grain was mixed with a differently pigmented material produced in the same way in a rato of 1:1:1:1, and then spread with a doctor blade onto a steel belt with a thickness of 6 mm and sintered at 200° C.
A section of the superficially sintered and cooled material with a reduced thickness of 4.0 mm was provided with a pattern by means of flat screen printing using a dyed acrylate-styrene dispersion. The dispersion employed had the following composition:
50 parts by weight of water
3 parts by weight of ammonium hydroxide 25% strength
400 parts by weight of "Neocryl XK 70"
22 parts by weight of ethyl glycol
8 parts by weight of "Etingal TP"
8 parts by weight of defrother "Byk NP 3100"
25 parts by weight of "Additol XW 330" 7.5% strength
95 parts by weight of "Colanyl" oxide yellow G
35 parts by weight of "Colanyl" oxide red B
30 parts by weight of "Colanyl" oxide black B
The amount applied was 180 g/m² in the wet state. The dye dispersion had penetrated in correspondence with the printed pattern through the entire layer. The product was then dried.
The thus-patterned and dried sheet was then compacted under a press at a temperature of 110° C. A molded component is obtained having a polychrome basic structure and carrying homogeneously throughout a design imparted by the printed pattern.

EXAMPLE 18

The sheet, produced according to Example 13 and sintered and imprinted according to Example 12, can likewise be manufactured in one working step via infrared radiators and a smoothing roll unit continuously into a polychrome, rough nonslip covering having a thickness of 3 mm, using less compression power by a corresponding calibration in the roll nip. In this way, a covering is obtained having a depth effect and a special textile appearance.

Analogously, the sintered sheet produced according to Example 17 can be calibrated via a roll nip, thus manufacturing a nonslip, polychrome covering.

Figure 19:
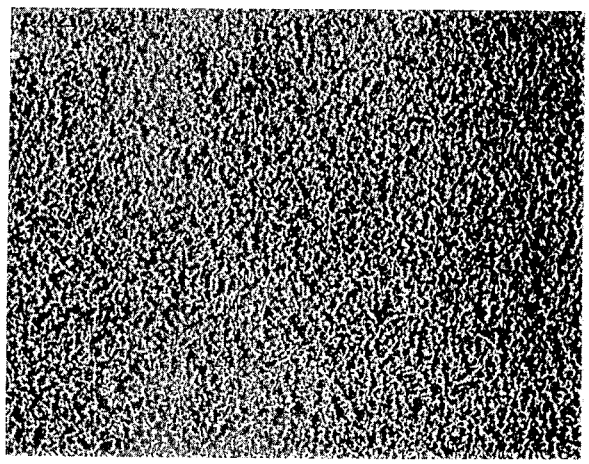
FIGS. 19–23 show various designs corresponding to different grain mixtures and dye applications.

FIG. 19 shows a top view of the sintered, porous sheet which has not as yet been compacted, according to Example 10, in a 1.3 magnification.

Figure 20:

FIG. 20 shows a top view of a finished product according to Example 10 with free design.

Figure 21:
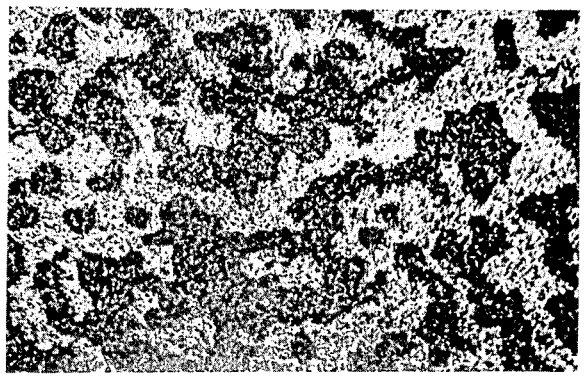
Figure 22:
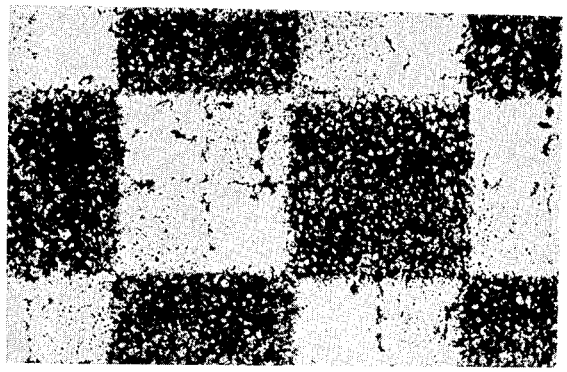
Figure 23:
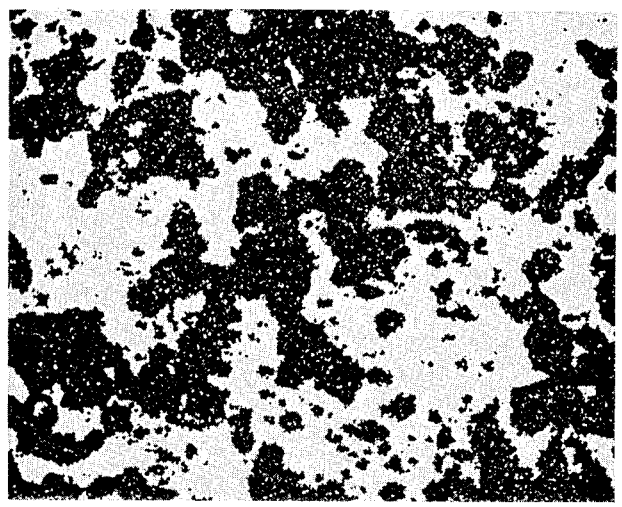

FIG. 21 shows a top view of a finished product according to Example 12, FIG. 22 shows a top view of a finished product according to Example 16, and FIG. 23 shows a top view of a finished product according to Example 14.

The designs of floor coverings illustrated in FIGS. 20–23 show the fine texturing possible, due to the use of the specific grain mixtures, at least in its basic traits since the black-white representation, of course, fails to show the color impression, and a substantial part of the color nuances is thus lost.

What is claimed is:

1. A process for the production of multicolored, homogeneous flooring sheets made of thermoplastic synthetic resin wherein pourable particles are continuously formed into a uniform layer and are sintered under the action of heat up to the plasticization of the thermoplastic synthetic resin to form a coherent, porous layer; and the porous layer is press-molded under the action of pressure and heat to form a flooring sheet that is void-free and smooth, and wherein several colored batches of thermoplastic resin are formed, with each batch having a color different from the other; each batch is then heat-treated above the softening point of the thermoplastic resin and is formed into colored agglomerates or colored granules; a blend of differently colored agglomerates or granules is prepared in a predetermined mixing ratio; the blend is mechanically comminuted to form the pourable particles which comprise a multi-colored mixture of particles having a random grain size distribution and, thereafter, the pourable particles are continuously applied directly to a conveyor surface to form the uniform layer which is subsequently sintered to form the porous layer.

2. A process according to claim 1, wherein the mixture of particles is obtained in the form of abraded dust by grinding off sheet material produced from the blend of agglomerates or granules.

3. A process according to claim 1, wherein the mixture of particles produced by abrading contains a proportion of about 60–90% by weight of particles having a grain size of 250 μm to 800 μm.

4. A process according to claim 1, wherein a mixture of particles having grain sizes up to 2 mm is obtained by fine grinding of granules or agglomerates.

5. A process according to claim 1, wherein colored agglomerates are used to form the mixture of particles.

6. A process according to claim 5, wherein a mixture of the agglomerates is obtained by mixing a PVC composition at mixing temperatures up to about 170° C. with subsequent cooling and grinding and screening.

7. A process according to claim 6, wherein the mixture of agglomerates contains a proportion of about 20–75% by weight having a grain size of 500–2,000 μm.

8. A process according to claim 1, wherein the mixture of particles is obtained from granules by comminution and fine grinding and screening out a proportion of about 30–95% by weight of grain sizes of 500–2,000 μm.

9. A process according to claim 1, wherein said mixture of particles has a grain distribution wherein each screening fraction is represented with a minimum proportion of about 0.1% by weight, and no screening fraction is represented with a proportion larger than 50% by weight.

10. A process according to claim 1, wherein said mixture of particles contains 80–98% by weight proportion of grain sizes from 300 to 800 μm.

11. A process according to claim 1, wherein a batch of thermoplastic synthetic resin is obtained from a PVC composition containing:
   60–80% by weight of PVC having a K-value of 50–80,
   19–39% by weight of a plasticizer based on phthalic acid esters, and
   0.5–2% by weight of stabilizer based on at least one of a barium-cadmium, a calcium-zinc and a tin compound;
   followed by separating said batch into smaller batches and admixing 0–3% by weight of colorant with each of the smaller batches to provide differently colored smaller batches, admixing the differently colored smaller batches, thereafter, plasticizing each batch above the softening point of the thermoplastic resin and forming each smaller batch into granules or agglomerates.

12. A process according to claim 11, wherein a batch of thermoplastic synthetic resin is prepared from a PVC composition containing:
   40–60% by weight of PVC having a K-value of 50–80,
   18–24% by weight of plasticizer based on phthalic acid esters
   20–40% by weight of a filler including calcium carbonate, and
   0.5–2% by weight of stabilizer based on at least one of a barium-cadmium, a calcium-zinc and a tin compound;
   thereafter, separating the batch into smaller batches, with each smaller batch being admixed with 0–3% by weight of a colorant to provide a plurality of differently colored smaller batches, thereafter, plasticizing the smaller batches at temperatures above the softening point of the PVC and forming each smaller batch into granules or agglomerates.

13. A process according to claim 1, which comprises piling up from the mixture of particles a layer having a thickness of about 5–12 mm onto a supporting belt, and heating this layer to temperatures of up to about 210° C., sintering, and then press-molding homogeneously to form a sheet or panel having a final thickness of about 1.5–4 mm under a surface pressure in the range from about 0.2 to 20 N/mm², or under a corresponding linear pressure in a roll nip.

14. A process according to claim 1, wherein the thermoplastic synthetic resin comprises a copolymer based on ethylene-vinyl acetate.

15. A process according to claim 14, wherein the mixture of particles comprises multi-colored particles, differently colored particles and transparent particles.

16. A process for the production of multicolored, homogenous flooring sheets made of thermoplastic synthetic resin wherein pourable particles are continuously formed into a uniform layer and are sintered under the action of heat up to the plasticization of the thermoplastic synthetic resin to form a coherent, porous layer; then at least one colored medium is applied in a predetermined pattern penetrating into the coherent porous layer and the porous layer is press-molded under the action of pressure and heat to form a flooring sheet that is void-free and smooth, and wherein several colored batches of thermoplastic resin are formed, with each batch having a color different from the other; each batch is then heat treated above the softening point of the thermoplastic resin and is formed into colored agglomerates or colored granules; a blend of differently colored agglomerates or granules is prepared in a predetermined mixing ratio; the resulting blend is mechanically comminuted to form the pourable particles which comprise a multi-colored mixture of particles having a random grain size distribution and, thereafter, the pourable particles are continuously applied directly to a conveyor surface to form the uniform layer which is subsequently sintered to form the porous layer.

17. A process according to claim 16, wherein that the mixture of particles includes multi-colored particles, differently colored particles and transparent particles of thermoplastic synthetic resin.

18. A process according to claim 16, wherein the mixture of particles is obtained, by extruding the resulting blend of agglomerates or granules into a sheet material and then abrading the sheet material to provide abrasion dust having grain sizes of up to 2 mm.

19. A process according to claim 18, wherein the mixture of particles produced by abrading the sheet material contains a proportion of 60-90% by weight of particles having a grain size of 250 μm to 800 μm.

20. A process according to claim 16, wherein the mixture of particles is obtained from agglomerates produced by mixing a PVC composition at mixing temperatures of up to 170° C. with subsequent cooling and grinding and screening, the mixture containing a proportion of about 20-70% by weight of a grain size of 500 to 2,000 μm.

21. A process according to claim 16, wherein the mixture of particles is obtained from granules, the mixture containing a proportion of about 30-95% by weight of particles having a grain size of from 500 to 2,000 μm.

22. A process according to claim 1, wherein the layer is formed from a plurality of blends of particles of various origins, colors structures and grain distributions.

23. A process according to claim 16, wherein the mixture of particles contains a grain distribution having a proportion of 90-100% by weight of a grain size ranging from 300 to 800 μm.

24. A process according to claim 16, wherein a batch of thermoplastic resin is obtained from a PVC composition containing:
60-80% by weight of PVC having a K-value of 50-80,
19-39% by weight of a plasticizer based on phthalic acid esters, and
0.5-2% by weight of stabilizer based on at least one of a barium-cadmium, a calcium-zinc and a tin compound;

thereafter, the batch is separated into smaller batches and each of the smaller batches is admixed with 0-3% by weight of a colorant to form a plurality of smaller batches each having a different color and each colored smaller batch is plasticized and formed into agglomerates or granules.

25. A process according to claim 16, wherein a batch of thermoplastic resin is obtained from a PVC composition containing:
40-60% by weight of PVC having a K-value of 50-80,
18-24% by weight of plasticizer based on phthalic acid esters
20-40% by weight of a filler including calcium carbonate, and
0.5-2% by weight of stabilizer based on at least one of a barium-cadmium, a calcium-zinc and a tin compound;

thereafter, separating the batch into smaller batches and each smaller batch is admixed with 0-3% by weight of a colorant to form a plurality of smaller batches each having a different color, then plasticizing each smaller batch to form differently colored granules or agglomerates.

26. A process according to claim 16, wherein the process includes the steps of piling up the mixture of particles to form a layer having a thickness of about 5-12 mm on the conveyor surface, and heating this layer to temperatures of about 210° C. and sintering same, and thereafter cooling to a temperature of below 50° C., subsequently applying a liquid colored med light per unit area of about 100-900 g/m$^2$ in succession by spraying or printing and evaporating solvent contained therein, and heating the superficially sintered layer provided with an application of the colored medium to a temperature of at least 150° C. and compressing same homogeneously into a sheet having a final thickness of about 1.5-4 mm under a surface pressure in the range of from about 0.2 to 20 N/mm$^2$-or under a corresponding linear pressure in a roll nip.

27. A process according to claim 16, wherein at least one liquid colored medium is used in the form of pastes, aqueous polymer dispersions, or polymers dissolved in organic solvents.

28. A process according to claim 11, wherein the at least one liquid colored medium is applied by printing or spraying.

29. A process according to claim 12, wherein the at least one liquid medium is applied by the screen printing method.

30. A process according to claim 13, wherein the thermoplastic synthetic resin is a copolymer based on ethylene-vinyl acetate.

* * * * *